United States Patent
Wong et al.

(10) Patent No.: US 6,926,346 B1
(45) Date of Patent: Aug. 9, 2005

(54) ADJUSTABLE VEHICULAR AIRFLOW CONTROL DEVICE

(75) Inventors: Alec C. Wong, Bellevue, WA (US); Daniel Farmer, Coupeville, WA (US)

(73) Assignee: PACCAR Inc, Bellevue, WA (US)

( * ) Notice: Subject to any disclaimer, the term of this patent is extended or adjusted under 35 U.S.C. 154(b) by 0 days.

(21) Appl. No.: 10/797,955

(22) Filed: Mar. 11, 2004

(51) Int. Cl.$^7$ .............................................. B62D 37/02
(52) U.S. Cl. ................. 296/180.5; 296/180.1
(58) Field of Search ................... 296/180.1, 180.2, 296/180.3, 180.5

(56) References Cited

U.S. PATENT DOCUMENTS

| | | | |
|---|---|---|---|
| 2,236,846 A | 4/1941 | Davisson | |
| 2,783,683 A | 3/1957 | Maurer | |
| 2,790,676 A | 4/1957 | McMurray | |
| 3,215,377 A | 11/1965 | Jarecki | |
| 3,695,674 A | 10/1972 | Baker | |
| 4,201,415 A | 5/1980 | Suchanek | |
| 4,262,954 A | 4/1981 | Thompson | |
| 4,379,582 A * | 4/1983 | Miwa ........................ | 296/180.5 |
| 4,627,657 A | 12/1986 | Daniels et al. | |
| 4,674,788 A | 6/1987 | Ohmura et al. | |
| 4,810,022 A * | 3/1989 | Takagi et al. ............. | 296/180.5 |
| 4,892,345 A | 1/1990 | Rachael, III | |
| 4,929,013 A | 5/1990 | Eke | |
| 4,952,006 A | 8/1990 | Willey | |
| 5,052,745 A | 10/1991 | Preiss | |
| 5,112,095 A | 5/1992 | Lund et al. | |
| 5,165,751 A * | 11/1992 | Matsumoto et al. ...... | 296/180.5 |
| D335,854 S | 5/1993 | Stanesic | |
| 5,280,386 A | 1/1994 | Johnson | |
| 5,317,880 A * | 6/1994 | Spears ......................... | 62/239 |
| 5,348,363 A | 9/1994 | Fink | |
| 5,374,098 A * | 12/1994 | Nelson ..................... | 296/180.1 |
| 5,403,059 A | 4/1995 | Turner | |
| 5,429,411 A * | 7/1995 | Spears ..................... | 296/180.1 |
| 5,544,931 A * | 8/1996 | Nelson ..................... | 296/180.1 |
| 5,755,483 A | 5/1998 | Lund | |
| 5,791,719 A | 8/1998 | Alley | |
| 5,876,088 A * | 3/1999 | Spears ..................... | 296/180.5 |
| 6,027,156 A | 2/2000 | Lund et al. | |
| 6,575,522 B2 * | 6/2003 | Borghi et al. ............. | 296/180.5 |
| 6,736,447 B2 * | 5/2004 | Angelo et al. ........... | 296/180.1 |
| 2002/0093220 A1 * | 7/2002 | Borghi et al. ............. | 296/180.5 |
| 2003/0230677 A1 * | 12/2003 | Milliere ...................... | 244/213 |

* cited by examiner

*Primary Examiner*—Patricia L. Engle
(74) *Attorney, Agent, or Firm*—Christensen O'Connor Johnson Kindness PLLC

(57) ABSTRACT

An adjustable vehicular airflow control device (10 and 100). The control device includes a deflector panel (12 and 112) adapted to be disposed on a front section (14) of a vehicle to selectively control airflow about the front section of the vehicle. The control device further includes an actuator assembly (28 and 128) coupled to the deflector panel for linearly moving the deflector panel, such as in vertical direction and/or a fore and aft direction, and rotating the deflector panel. Preferably, the deflector panel is adjustable while the vehicle is moving. A method of controlling a position of a deflector panel disposed on a front section of a vehicle. The method includes sensing a speed of the vehicle and automatically adjusting a position of the deflector panel relative to the vehicle based upon the sensed speed of the vehicle.

19 Claims, 8 Drawing Sheets

US 6,926,346 B1

ADJUSTABLE VEHICULAR AIRFLOW CONTROL DEVICE

FIELD OF THE INVENTION

The present invention relates generally to airflow control devices for vehicles, and more specifically to vehicular airflow control devices which are adjustable in position.

BACKGROUND OF THE INVENTION

Providing a driver of a vehicle with the best possible view of the terrain in front of the vehicle has long been a primary concern in the manufacturing and operation of a vehicle. However, during operation, debris, such as road grime, insects, etc., often gathers on the windshield's outer surface as the vehicle travels down the road. As the debris accumulates on the windshield, the driver's visibility through the windshield becomes impaired. This problem becomes more acute when the vehicle is driven over long distances at highway speeds.

One previously developed solution to this problem is to install a deflector shield, such as that shown in U.S. Pat. No. 5,280,386. Typically, the deflector shield, commonly referred to as a "bug deflector," is mounted near the leading edge of a hood of the vehicle in a fixed position. A vertically oriented deflector shield with a large surface area has been found to provide excellent bug-deflecting efficiency. However, the large surface area and vertical orientation significantly increases the aerodynamic drag of the vehicle, especially at high speeds. Since the deflector shield is mounted in a fixed location, the deflector shield is not adjustable for various vehicle speeds, nor is the deflector shield adjustable on the fly to accommodate a change in environmental conditions, such as a change in insect density. Moreover, the deflector shield remains fixed in one position, and therefore either provides too much drag or too much or too little road debris protection as the vehicle speed or debris density varies from a narrow design range.

Another concern of vehicle manufacturers and operators is the fuel efficiency of the vehicle. It is well known that by improving the aerodynamic characteristics of a vehicle, the fuel efficiency of the vehicle can correspondingly be improved. It has been found that by placing an airstream deflector shield upon a vehicle, the aerodynamic characteristics of the vehicle may be improved. Typically, the deflector shield is mounted near the leading edge of the hood and is shaped and positioned to direct airflow above a roof of a cab of the vehicle, and/or to the sides of the vehicle. It has been found that the optimum position of the wind deflector shield is dependent upon the speed of the vehicle. Previously developed wind deflector shields are typically mounted in a fixed position upon the hood, and are not adjustable in height, longitudinal position, and/or inclination to accommodate changes in vehicle speed. Thus, the wind deflector shield is not adjustable for various vehicle speeds, and an increase in drag is realized whenever the speed of the vehicle varies from the narrow design range at which the wind deflector is positioned for.

Thus there exists a need for a vehicular air control device which is adjustable in height, longitudinal position, and/or inclination to adjust either the debris protection and/or aerodynamic characteristics of the vehicle to accommodate changes in conditions, such as vehicle speed and/or debris protection desired. Preferably, the vehicular air control device is adjustable while the vehicle is moving, i.e. with the driver in the cab, so that the position of the vehicular air control device can be adjusted to accommodate changing conditions "on the fly."

SUMMARY OF THE INVENTION

One embodiment of an adjustable vehicular airflow control device formed in accordance with the present invention is provided. The adjustable vehicular airflow control device includes a deflector panel adapted to be disposed on a front section of a vehicle to selectively control airflow about the front section of the vehicle. The vehicular airflow control device includes an actuator assembly coupled to the deflector panel for linearly moving the deflector panel and/or rotating the deflector panel. The actuator assembly may be adapted to displace the deflector panel substantially in a fore and aft direction relative to the vehicle, a vertical direction, and/or rotate the deflector panel. The adjustable vehicular airflow control device may include a controller coupled in communication with the actuator assembly, the controller operable to automatically control the actuator assembly to adjust the position of the deflector panel based upon a sensed speed of the vehicle. The deflector panel may be adjusted while the vehicle is moving.

One embodiment of a front section of a vehicle formed in accordance with the present invention is provided. The front section includes a hood having a top surface, the top surface having an opening therein. The front section further includes an adjustable airflow control device including a deflector panel and an actuator assembly. The actuator assembly is used for moving the deflector panel into a stored position in which the deflector panel is substantially flush mounted in the opening, and a deployed position in which at least a portion of the deflector panel is disposed above the top surface to engage an airstream flowing over the top surface. The actuator assembly adjusts the deployed position of the deflector panel by both linearly and rotatingly displacing the deflector panel.

One embodiment of a method performed in accordance with the present invention for controlling a position of a deflector panel disposed on a front section of a vehicle is provided. The method includes sensing a speed of the vehicle and automatically adjusting a position of the deflector panel relative to the vehicle based upon the sensed speed of the vehicle.

BRIEF DESCRIPTION OF THE DRAWINGS

The foregoing aspects and many of the attendant advantages of this invention will become more readily appreciated by reference to the following detailed description, when taken in conjunction with the accompanying drawings, wherein.

DETAILED DESCRIPTION OF THE PREFERRED EMBODIMENT

Figure 1:
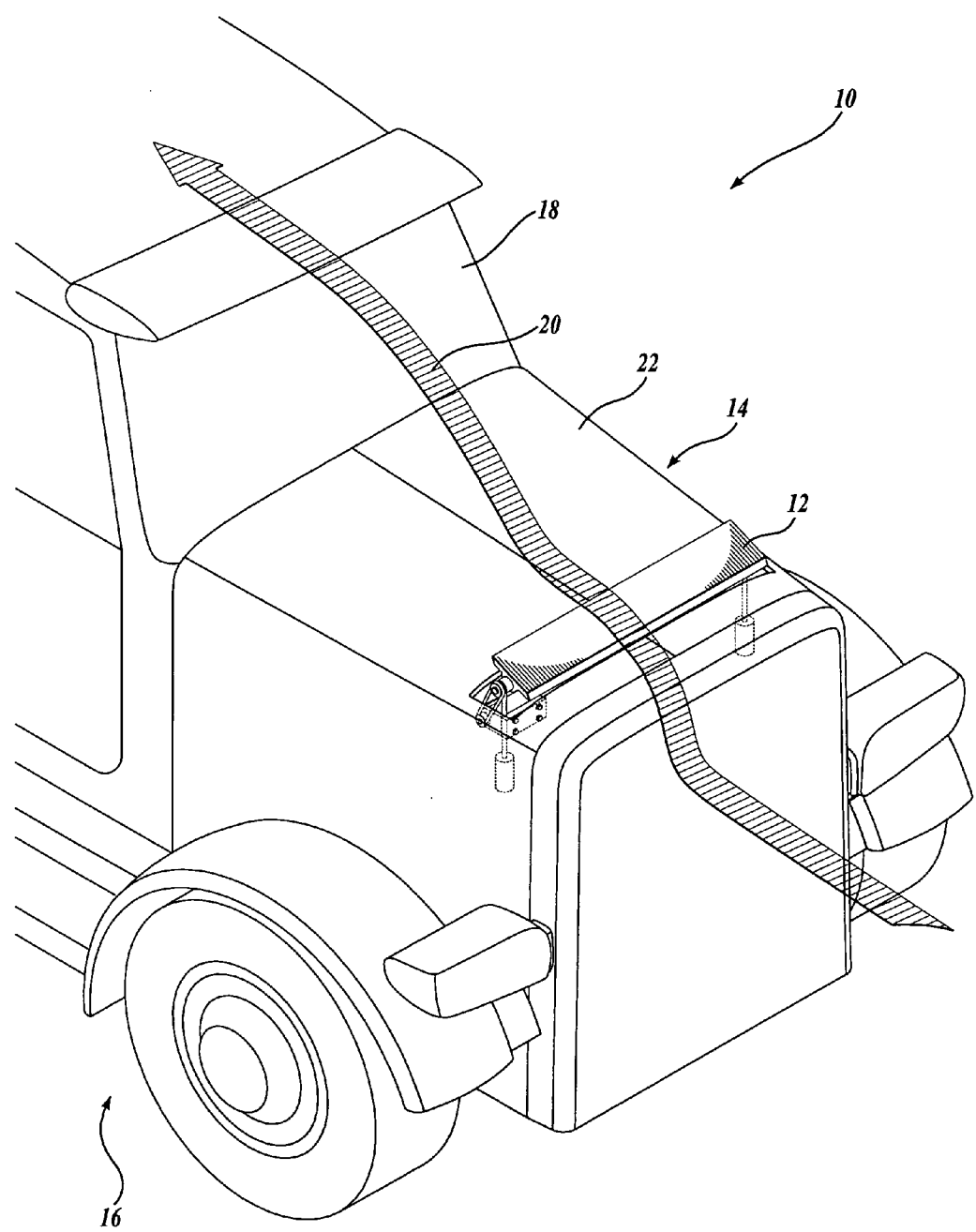
FIG. 1 is a perspective view of a vehicle having one embodiment of an adjustable vehicular airflow control device formed in accordance with the present invention, wherein a deflector panel of the control device is shown in an elevated and inclined position.

Referring to FIGS. 1–6, one embodiment of an adjustable vehicular airflow control device 10 formed in accordance with the present invention is depicted. Referring to FIG. 1, the adjustable vehicular airflow control device 10 includes a deflector panel 12. The deflector panel 12 is mounted upon a front section 14 of a vehicle 16 to minimize an aerodynamic drag of the vehicle 16 and to aid in keeping a windshield 18 of the vehicle 16 clean. The deflector panel 12 selectively directs a substantial portion of an airstream 20 passing over a top surface 22 of the front section 14 of the vehicle 16 above the windshield 18 to reduce the aerodynamic drag of the vehicle 16 and to keep debris entrained in the airstream 20 from impacting the windshield 18.

The deflector panel 12 is adjustable in inclination and height. The adjustability of the deflector panel 12 permits the angle and height of the deflector panel 12 to be adjusted to minimize the aerodynamic drag of the vehicle and/or provide maximum resistance to debris accumulation on the windshield 18. The position of the deflector panel 12 may be manually or automatically adjusted. Preferably, the position of the deflector panel 12 is adjustable on the fly, i.e., while the vehicle 16 is moving.

Figure 2:
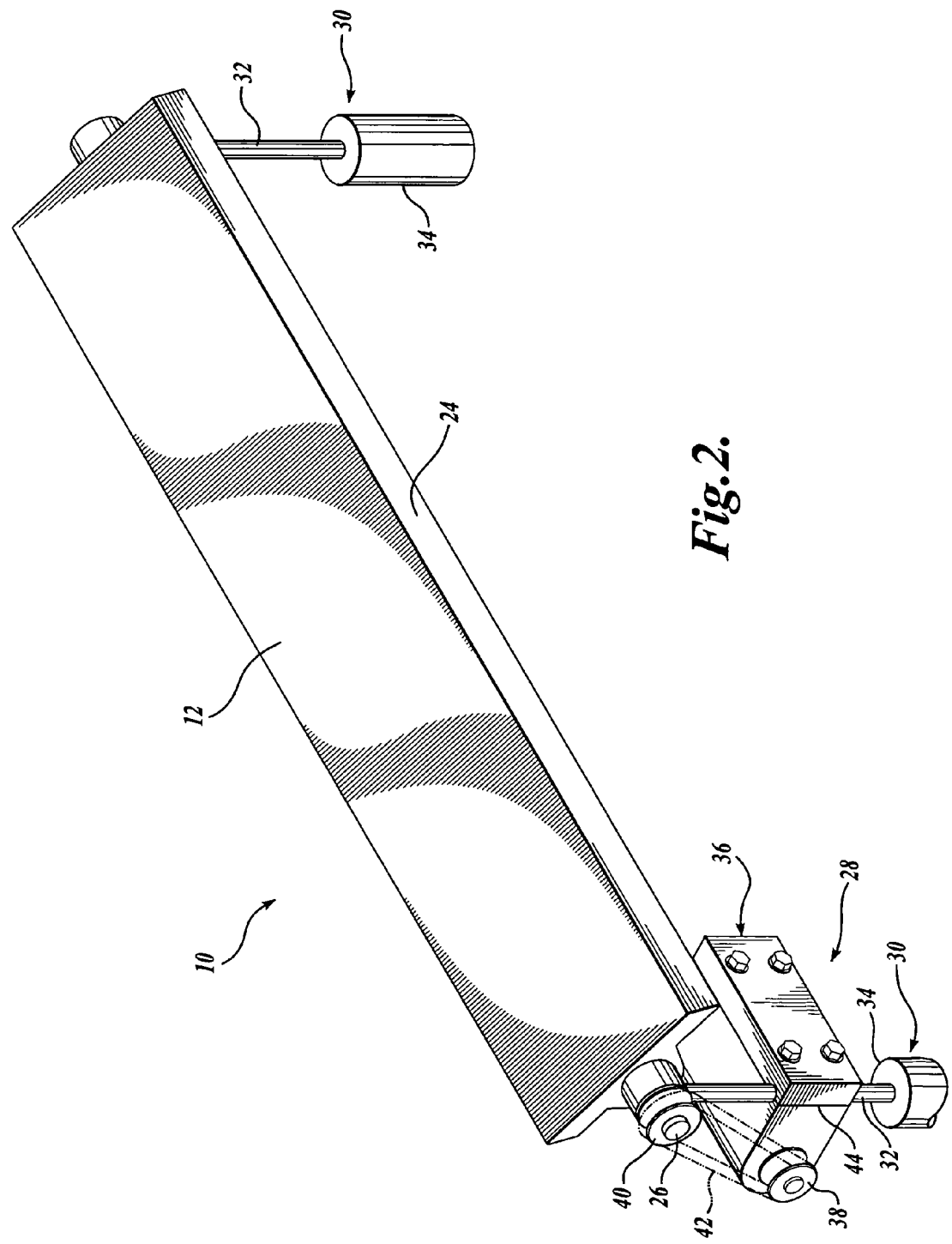
FIG. 2 is a perspective view of the control device depicted in FIG. 1.
Figure 3:
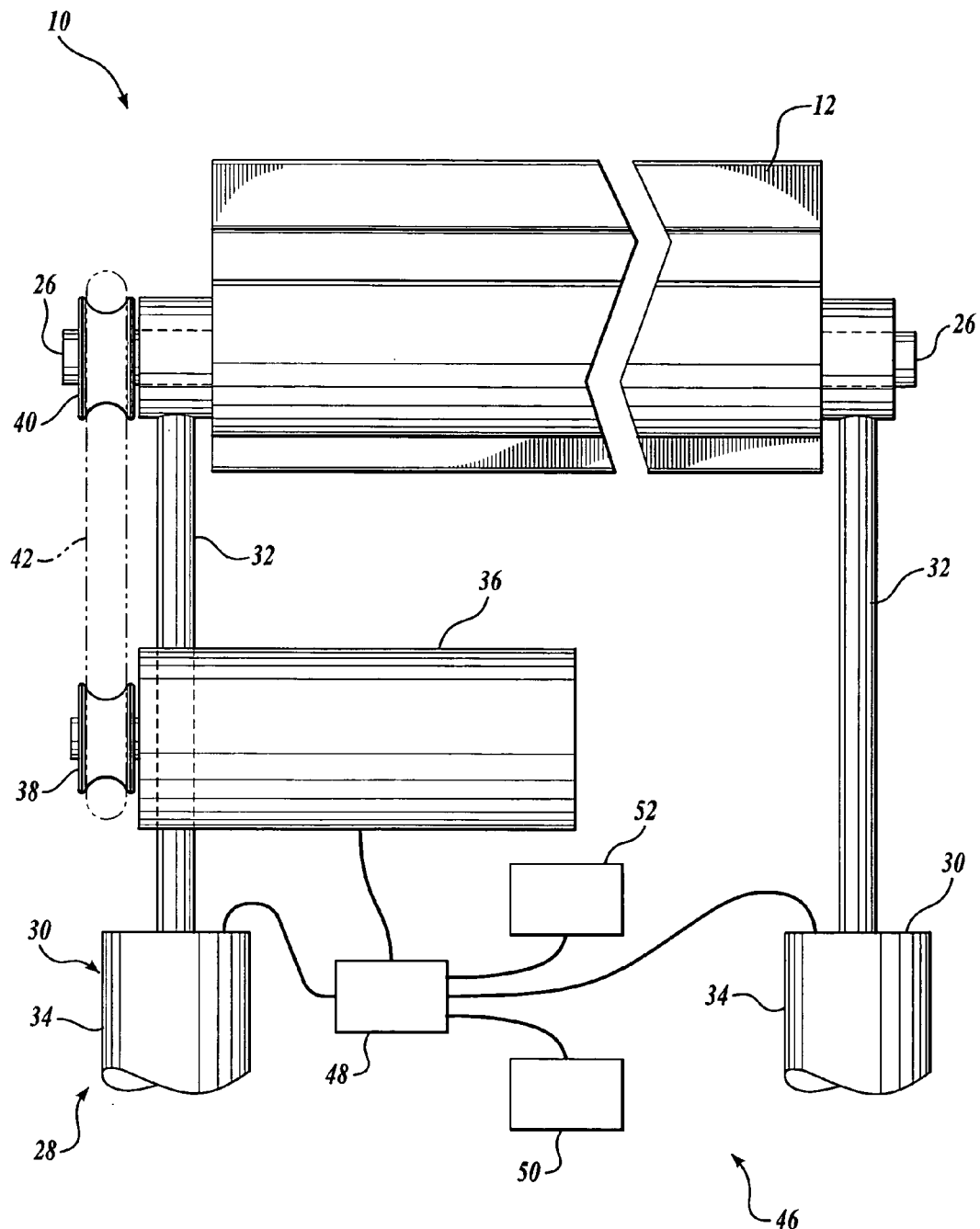
FIG. 3 is an elevational front view of the control device depicted in FIG. 2 with a control system shown.

Referring now to FIGS. 2 and 3, the structure of the adjustable vehicular airflow control device 10 will now be described in further detail. As described above, the adjustable vehicular airflow control device 10 includes a deflector panel 12. The deflector panel 12 of the illustrated embodiment is a planar, rectangular shaped member. The deflector panel 12 may be formed from any suitable semi-rigid or rigid material, some suitable examples being plastic, fiberglass, composite materials, and metal. A chamfer 24 may be formed on the leading and trailing edges of the deflector panel 12 to facilitate the mating of the deflector panel 12 with a top panel 25 (See FIG. 4) of the front section 14 and to improve the aerodynamic characteristics of the deflector panel 12. Although the deflector panel 12 is illustrated and described as being a planar, rectangular shaped member, it should be apparent to those skilled in the art that the deflector panel 12 may take any shape, some suitable shapes being curved, curvilinear, polygonal, etc. In one embodiment, the deflector panel 12 is shaped to conform to the contours of the hood such that when the deflector panel 12 is placed in a stored position as described below, an outer surface of the deflector panel 12 rests flush with the top surface of the vehicle's hood.

The deflector panel 12 includes a pair of stub shafts 26 rigidly coupled to the deflector panel 12. The stub shafts 26 extend laterally outward from the sides of the deflector panel 12. Although the stub shafts 26 are illustrated as being attached substantially equidistant between the leading and trailing edges of the deflector panel 12, it should be apparent to those skilled in the art that the stub shafts 26 may be disposed in other locations, such as closer to either the leading or trailing edge of the deflector panel 12.

The deflector panel 12 is coupled to an actuator assembly 28. The actuator assembly 28 selectively adjusts both the height and inclination of the deflector panel. Preferably, the actuator assembly 28 is adapted to adjust either independently or simultaneously the height and inclination of the deflector panel 12.

The actuator assembly 28 includes a pair of linear actuators 30. Each linear actuator 30 includes a drive rod 32 that may be selectively reciprocated relative to an actuator body 34. The actuator body 34 is in turn rigidly coupled to the vehicle. A distal end of each drive rod 32 is rotatingly coupled to one of the stub shafts 26. The linear actuators 30 are preferably actuated in tandem to drive the drive rods 32 and attached deflector panel 12 in a linear direction. Preferably, the drive rods 32 are oriented in a substantially vertical direction, however it should be apparent to those skilled in the art that other orientations are also within the spirit and scope of the present invention. The linear actuators 30 may take many forms, such as pneumatic or hydraulic pistons, linear motors, magnetic actuators, cable driven actuators actuated from the cab by the driver, slides, track and groove arrangements, manually positionable support members which may be positioned and then secured in the selected position, etc. Further, although a pair of linear actuators 30 are illustrated and described, it should be apparent that any number of linear actuators 30 are suitable for use with and within the spirit and scope of the present invention, including a single linear actuator.

The actuator assembly 28 further includes a rotary actuator 36. The rotary actuator 36 is adapted to selectively drive a rotary drive member 38, a few suitable examples being a pulley, a gear, or a sprocket. A similar rotary drive member 40 is rigidly coupled to the distal end of one of the stub shafts 26. An endless flexible member 42 couples the rotary drive members 38 and 40 together, such that rotation of one results in the rotation of the other. The rotary drive members 38 and 40 may be similarly sized or disparagingly sized to provide a gearing effect. The endless flexible member 42 may take many forms, a few suitable examples being belts or chains.

Figure 7:
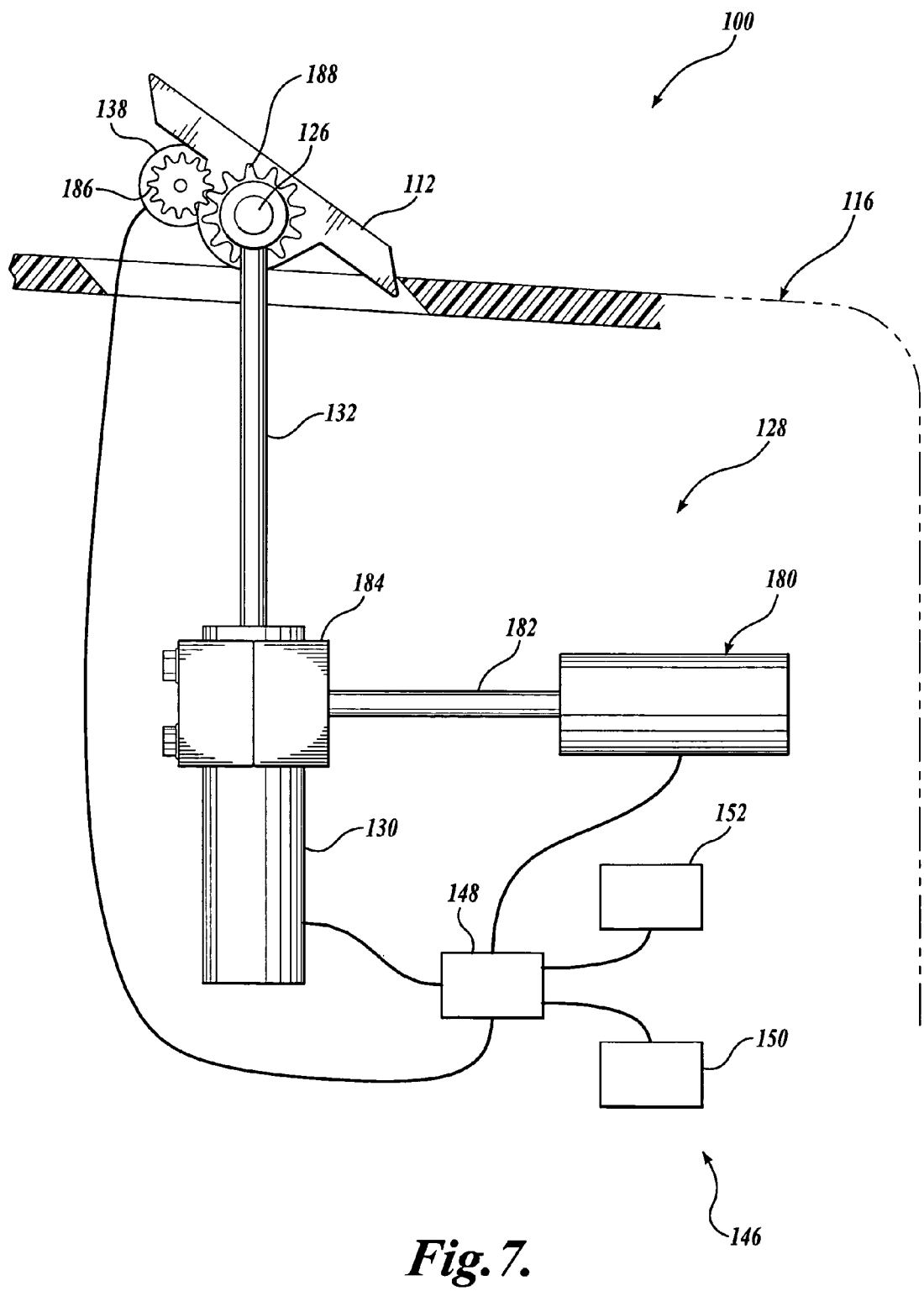
FIG. 7 is a side view of an alternate embodiment of an adjustable vehicular airflow control device formed in accordance with the present invention, wherein the deflector panel is rotated by an actuator mounted to the deflector panel and wherein the deflector panel is further actuatable in a longitudinal direction to permit adjustment of the longitudinal location of the deflector panel.
Figure 8:
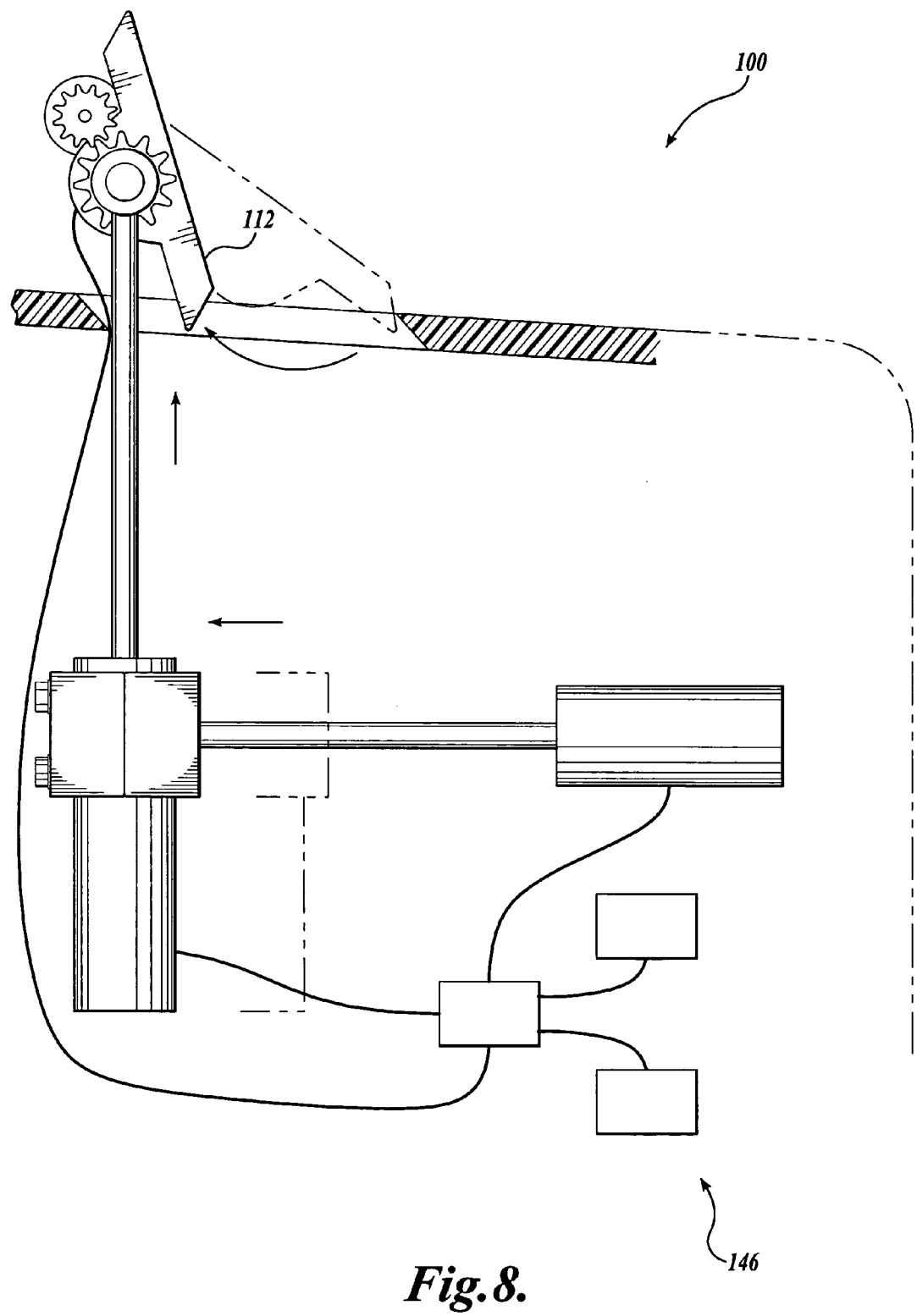
FIG. 8 is a side view of the adjustable vehicular airflow control device depicted in FIG. 7 wherein the deflector panel has been raised, inclined, and moved longitudinally aft from the position of the deflector panel depicted in FIG. 7.

The rotary actuator 36 is preferably coupled to one of the linear actuators 30 such that actuation of the drive rods 32 results in a corresponding linear movement of the rotary actuator 36. This arrangement maintains the spacing between the rotary drive members 38 and 40. In other embodiments, the rotary actuator is stationary and the flexible endless line stretches to accommodate the linear movement of the upper rotary drive member 40. In another embodiment, the rotary actuator 36 is not coupled to one of the linear actuators 30, but is moved in correspondence with the linear actuator 30 by another linear actuator. Further still, the rotary drive members 38 and 40 may be positioned to directly engage one another such that rotation of one causes the rotation of the other, eliminating the need for an endless flexible line, as shown in FIGS. 7 and 8. The rotary actuator 36 of the illustrated embodiment is coupled to the drive rod 32 of one of the linear actuators 30 by the use of a well known clamp 44. However, it should be apparent to those skilled in the art that other fastening systems are suitable for use for coupling the rotational actuator 36 to the linear actuator 30, and therefore are within the spirit and scope of the present invention.

Referring to FIG. 3, a control system 46 for selectively controlling the actuator assembly 28, and thus the height and inclination of the deflector panel 12, will now be described. The control system 46 includes a controller 48, a speed sensor 50, and input controls 52. Since controllers, speed sensors, and input controls, and their associated control logic, are well known, no specific hardware for performing the described functions is described herein for the sake of brevity.

The controller 48 receives user instructions or commands from a suitable source, such as the input controls 52 or from instructions preprogrammed into the controller 48, and selectively controls the operation (i.e. actuation) of the actuator assembly 28 to place the deflector panel 12 in a desired position. The controller 48 is preferably operable to control the position of the deflector panel 12 either manually or automatically. During manual operation, the controller senses user input through the input controls 52 and adjusts the position of the deflector panel 12 accordingly. In automatic mode, the controller 48 controls the position of the deflector panel 12 in coordination with the sensed speed of the vehicle, as will be described in more detail below. The controller 48 is coupled in signal communication with each of the components of the actuator assembly 28, such as the rotary actuator 36 and the linear actuators 30, and in signal communication with the speed sensor 50 and input controls 52, by any known method, one suitable example being a series of well known wires.

The speed sensor 50 is a well known sensor operable to sense a speed of the vehicle and translate the speed of the vehicle into an electrical signal to be received by the controller 48. Although a speed sensor 50 is shown in the illustrated embodiment, it should be apparent to those skilled in the art that other sensors are suitable for use with the present invention, a few suitable examples being an air speed sensor, a gear sensor for sensing what gear the vehicle is in, etc.

The input controls 52 permit a user to selectively control the controller 48. For instance, the input controls 52 may include a switch for placing the controller 48 in an automatic mode, wherein the height and inclination of the deflector panel 12 are automatically controlled for optimum performance by the controller 48 based upon the sensed speed of the vehicle or other parameters. The input controls 52 may include a switch to permit the user to place the controller in manual mode, wherein the user directly controls the inclination and height of the deflector panel 12 as the user sees fit. The input controls 52 may include a dial to permit, once the controller 48 has been placed in the manual mode, the user to selectively adjust a height of the deflector panel 12. Similarly, the input controls 52 may include another dial to permit, once the controller has been placed in the manual mode, the user to selectively adjust the inclination of the deflector panel 12. Further, the input control 52 may further include a switch to permit the user to selectively place the deflector panel 12 in a stored position, such as shown in FIG. 4, or another switch to place the deflector panel 12 in a vertical position for maximum protection from debris accumulation on the windshield.

The input controls 52 may include a switch or switches for toggling the controller 48 between an aerodynamic optimization mode and a debris accumulation protection optimization mode. In the aerodynamic optimization mode, the controller positions the deflector panel 12 in a predetermined position selected to provide optimum aerodynamic characteristics to the deflector panel 12 for a given or sensed vehicle speed. Likewise, in the debris accumulation protection optimization mode, the controller positions the deflector panel 12 in a predetermined position selected to provide optimum debris accumulation protection for a given or sensed speed. Further, input controls 52 may include one or more preset switches, each associated with a preset deflector panel 12 position. Activation of one of the preset switches actuates the controller 48 to place the deflector panel 12 in a predetermined position, such as a favorite position previously selected by the driver or preprogrammed into the controller to serve a specific function or accomplish a specific task.

Figure 4:
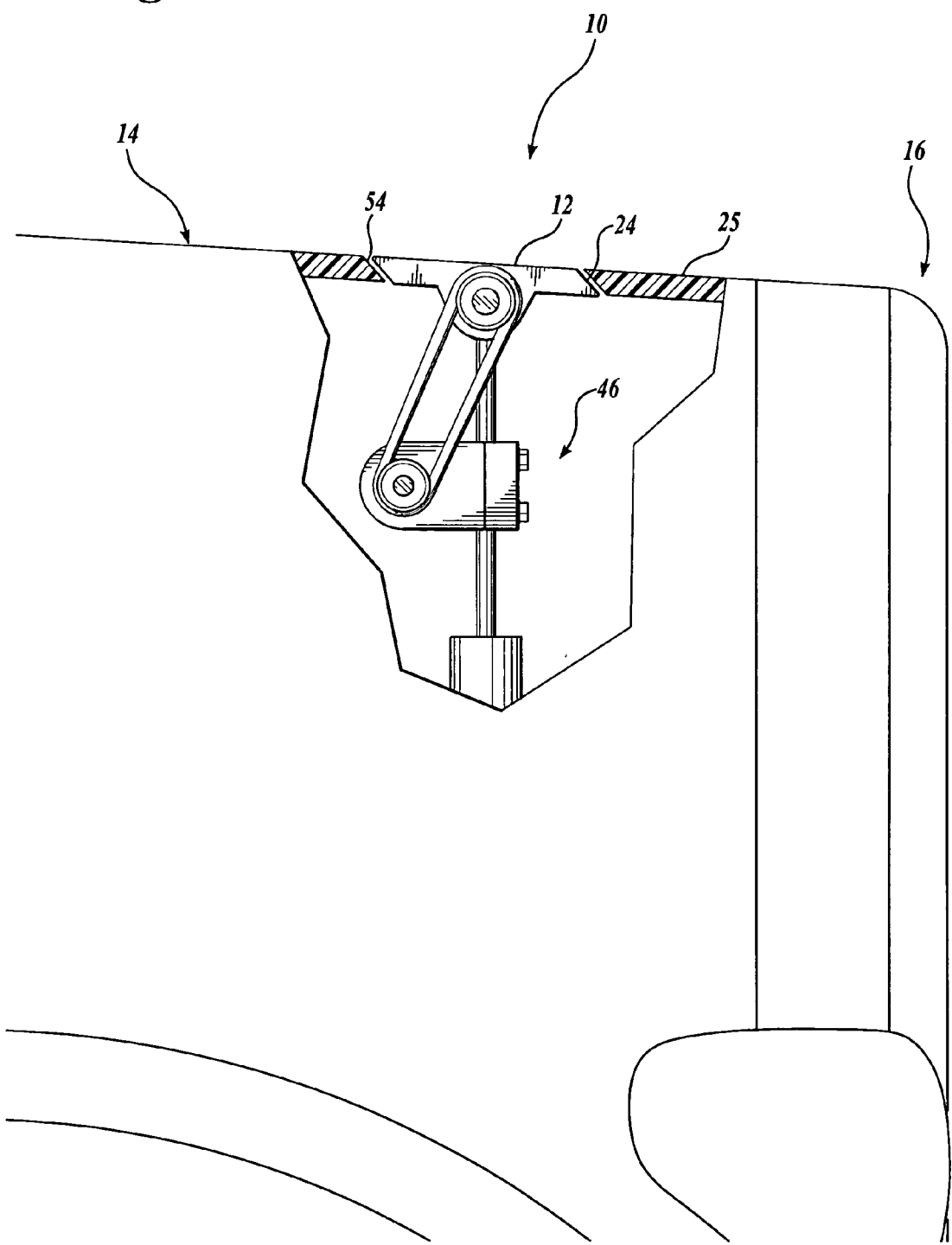
FIG. 4 is a side view of the vehicle and control device depicted in FIG. 1, wherein the deflector panel of the control device is shown in a stored position, wherein the deflector panel is positioned substantially flush with a hood of the vehicle.

Referring to FIGS. 3–6 and in light of the above description of the structure of the adjustable vehicular airflow control device 10, the operation of the adjustable vehicular airflow control device 10 will now be described. Referring to FIGS. 3 and 4, the control system 46 is operable to place the deflector panel 12 in a stored position. In the stored position, the deflector panel 12 is disposed within an opening 54 in the top panel 25 of the front section 14 of the vehicle 16. Preferably, the outer surface of the deflector panel 12 is flush with the outer surface of the top panel 25 to permit the smooth transition of air over the top panel 25 and the air deflector 12.

Figure 5:
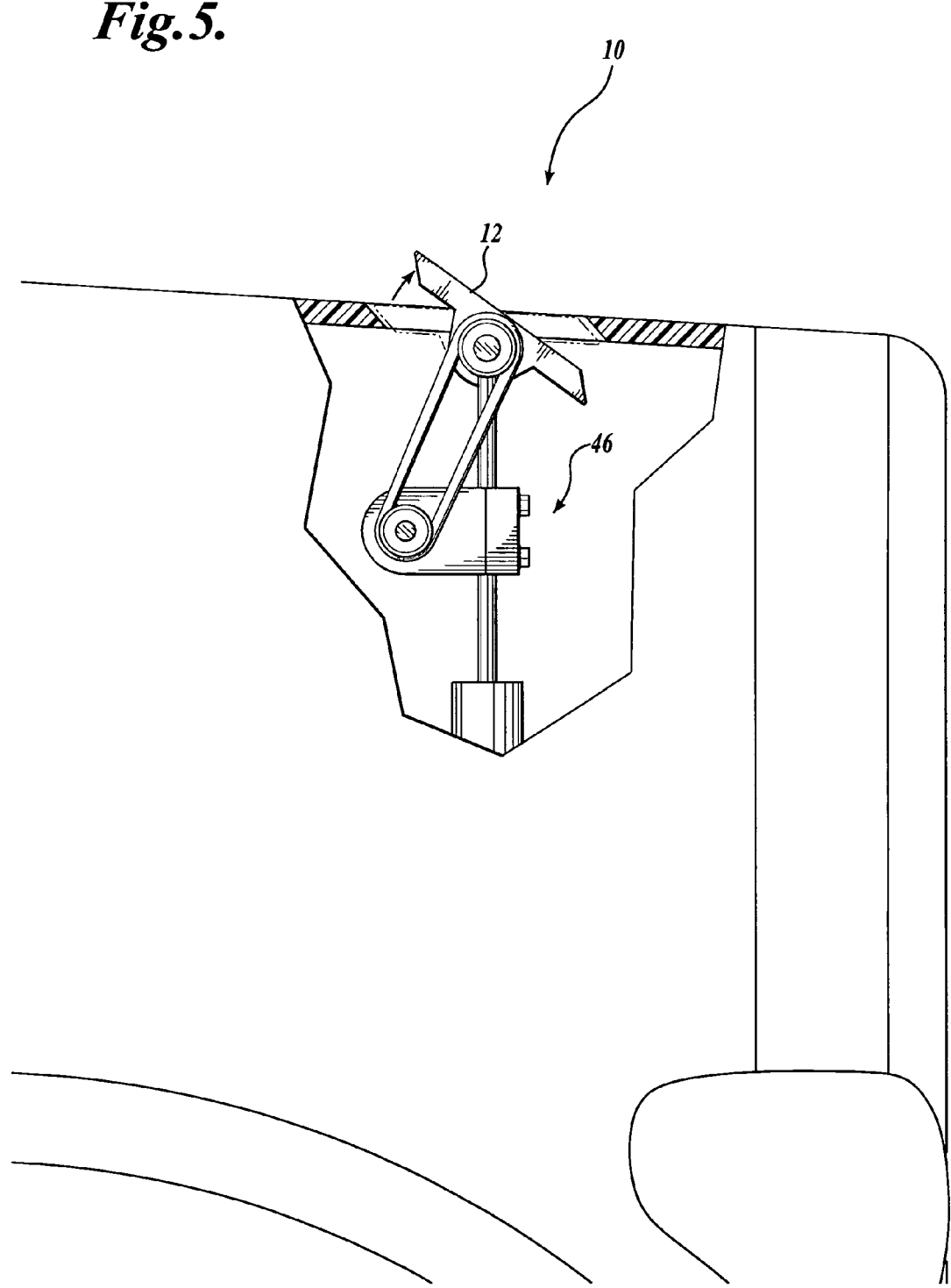
FIG. 5 is a side view of the vehicle and control device depicted in FIG. 4, wherein the deflector panel of the control device is shown in a partially inclined position.

Referring to FIG. 5, the control system 46 is operable to adjust the inclination of the deflector panel 12. In one embodiment, the deflector panel 12 may be rotated between a substantially horizontal position to a substantially vertical position. In another embodiment, the deflector panel 12 may be rotated a full 360 degrees permitting the deflector panel to be placed at any inclination. With respect to FIG. 5, the deflector panel 12 has been rotated approximately 35 degrees in a clockwise direction from the position of the deflector panel 12 as shown in FIG. 4 for illustrative purposes.

Figure 6:
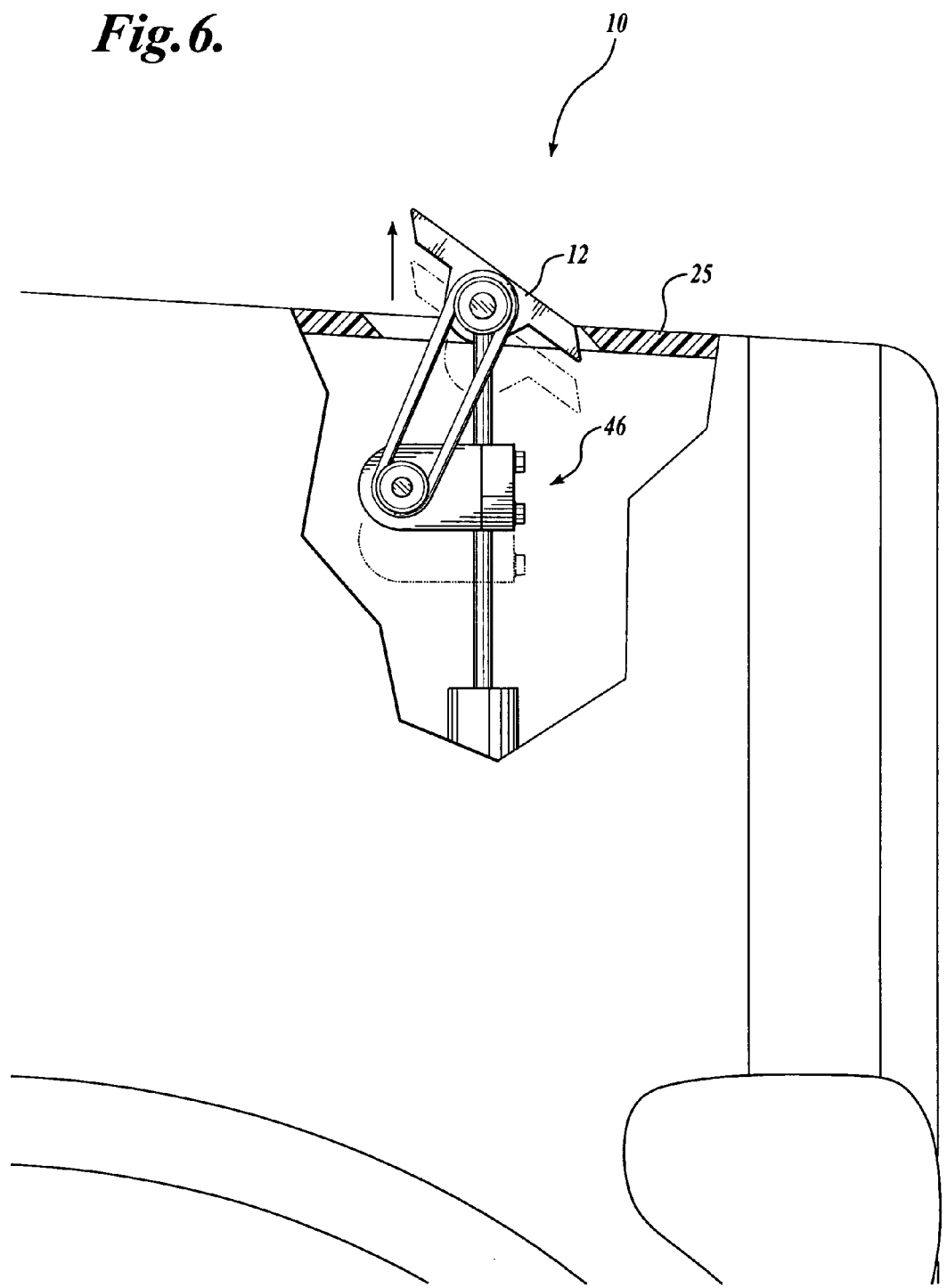
FIG. 6 is a side view of the vehicle and control device depicted in FIG. 5, wherein the deflector panel of the control device is shown in a partially raised and inclined position.

Referring to FIG. 6, the control system 46 is operable to adjust the height of the deflector panel 12. In one embodiment, the deflector panel 12 may be raised from below the top panel 25 to well above the top panel 25, such that even when the deflector panel 12 is in a substantially vertical position, the lowest portion of the deflector panel 12 is above the top panel 25. With respect to FIG. 6, the deflector panel 12 has been raised a few inches from the position of the deflector panel 12 as shown in FIG. 5 for illustrative purposes. Although the deflector panel 12 has been shown as being actuated in inclination separately from actuation of the deflector panel 12 in height, it should be apparent to those skilled in the art that the deflector panel 12 may be simultaneously actuated in both height and inclination.

As shown in FIGS. 4–6, the deflector panel 12 is adjustable in inclination and height. It may extend upward to increase debris protection capabilities (i.e. bug deflecting capabilities) or be retracted downward to increase aerodynamic efficiency. It may rotate to a full vertical position at low speed for maximum debris deflection efficiency, and may rotate to a lower inclination, for instance 45 degrees or less, at high speed to reduce aerodynamic drag resistance. Preferably, the adjustments would occur automatically based on vehicle speed, or upon actuation of the input controls by the driver while the vehicle is moving. Alternately, they may be manually set by the driver or other person with the vehicle parked. As should be apparent to those skilled in the art, the exact position of the deflector panel for each speed depends upon many factors and is best determined by modeling or testing to determine the best position for improved aerodynamics, debris deflection, or the position which represents the best comprise between the two if the goals of each cannot be simultaneously optimized.

Referring to FIGS. 7 and 8, an alternate embodiment of an adjustable vehicular airflow control device 100 formed in accordance with the present invention is depicted. The alternate embodiment is identical to the embodiment described above and depicted in FIGS. 1–6, with the exception that the deflector panel 112 of this alternate embodiment is additionally actuatable in a fore and aft direction and further, an alternate location of the rotary actuator 138 is shown. Inasmuch as all other aspects of this alternate embodiment are described above, for the sake of brevity, this detailed description will focus only upon the differences between this alternate embodiment and the previously described embodiment.

Discussion of the alternate embodiment of the adjustable vehicular airflow control device 100 will first focus upon the actuation assembly 128. Of note, during discussion of the alternate embodiment, components similar in structure to components described for the above described embodiment will be similarly numbered with the exception that 100 will be added to their reference numeral. The actuation assembly 128 includes the same components as described above, namely a rotary actuator 138 and a pair of vertically oriented linear actuators 130. However, the actuation assembly 138 of the adjustable vehicular airflow control device 100 of FIGS. 7 and 8 further includes a pair of horizontally oriented linear actuators 180 (one shown). The horizontal linear actuators 180 are oriented, as the name implies, substantially horizontal and in a fore and aft direction relative to the vehicle 116. The distal ends of the drive rods 182 associated with each of the horizontal linear actuators 180 are coupled to the vertical linear actuators 130 by a well known clamp 184. The horizontal linear actuators 180 are preferably rigidly secured to the vehicle 116, and in contrast to the above described embodiment, the vertical linear actuators 130 are free floating members. Thus, actuation of the drive rods 182 by the horizontal linear actuators 180 causes the linear displacement of the vertical linear actuators 130 and the deflector panel 112 coupled thereto in a fore and aft direction.

As stated above, the location of the rotary actuator 138 has also been changed with regard to this embodiment. In the previously described embodiment, the rotary actuator was spaced from the deflector panel. In this alternate embodiment, the rotary actuator 138 is coupled to the deflector panel 112. A pinion gear 186 is coupled to a rotatable shaft of the rotary actuator 138. The pinion gear 186 is positioned to engage a spur gear 188 rigidly coupled to the distal end of one of the drive rods 132 of the vertical linear actuators 130. Thus, rotation of the pinion gear 186 causes a corresponding movement of the deflector panel 112 while the spur gear 188 remains stationary.

Referring to FIG. 7, the control system 146 is substantially similar to the control system described for the above embodiment with the exception that the controller 148 of this embodiment is adapted to control the horizontal linear actuators 180 in addition to the other actuators 130 and 138. The speed sensor 150 is identical to that described above. The input controls 152 may be slightly modified to include switches to permit the user to additionally adjust the fore and aft location of the deflector panel 112 through actuation of the horizontal linear actuators 180.

Referring to FIGS. 7–8 and in light of the above description of the structure of the alternate embodiment of the adjustable vehicular airflow control device 100, the operation of the alternate embodiment will now be described. The control system 146 is operable to perform all of the functions described above for the previous embodiment. More specifically, the control system 146 is able to place the deflector panel 112 in a stored position, adjust the inclination of the deflector panel 112, and adjust the height of the deflector panel 112 in the same manner previously described. In addition to these functions, the control system 146 is operable to adjust the fore and aft position of the deflector panel 112. Like the height and inclination of the deflector panel 112, the fore and aft position of the deflector panel 112 may be adjusted automatically, such based upon the speed the vehicle, by user input through the user input controls 152, or by any other suitable means.

Still referring to FIGS. 7 and 8, as mentioned above, the control system 146 is operable to adjust the height, inclination, and fore and aft location of the deflector panel 112. This is best shown through comparison of FIG. 7 with FIG. 8. For instance, with respect to FIG. 8, the deflector panel 112 has been rotated approximately 35 degrees in a clockwise direction from the position of the deflector panel 112 shown in FIG. 7, raised in elevation a few inches, and moved aft about a foot for illustrative purposes.

Although the actuator assembly is described as moving the deflector panel in vertical and horizontal directions, it should be apparent to those skilled in the art that "vertical" and "horizontal" are illustrative terms, and not limiting. Preferably the actuators are operable to the move the deflector panel linearly in directions substantially perpendicular to one another, however these directions do not need to be limited to vertical or horizontal planes.

Although the deflector panel of the above embodiments is described as being positioned by an actuator assembly having actuators for automatically adjusting the position of the deflector panel, it should be apparent to those skilled in the art that the deflector panel may also use manual actuator assemblies, wherein a user must manual reposition the deflector panel in a desired position, and once positioned, secure same for use.

While the preferred embodiment of the invention has been illustrated and described, it will be appreciated that various changes can be made therein without departing from the spirit and scope of the invention.

The embodiments of the invention in which an exclusive property or privilege is claimed are defined as follows:

1. An adjustable vehicular airflow control device comprising:
   (a) a deflector panel adapted to be disposed on a vehicle to selectively control airflow about of the vehicle; and
   (b) an actuator assembly coupled to the deflector panel for moving the deflector panel, wherein the actuator assembly is adapted to move the deflector panel to independently adjust an inclination and an elevation of the deflector panel and wherein the actuator assembly is adapted to adjust the elevation of the deflector panel without resulting in a substantial change in the inclination or a longitudinal position of the deflector panel.

2. The adjustable vehicular airflow control device of claim 1, wherein the actuator assembly is adapted to move the deflector panel to simultaneously adjust the elevation and the inclination of the deflector panel.

3. The adjustable vehicular airflow control device of claim 1, wherein the actuator assembly is adapted to move the deflector panel to adjust a longitudinal position of the deflector panel.

4. The adjustable vehicular airflow control device of claim 1, wherein the actuator assembly moves the deflector panel from a stored position in which the deflector panel is substantially flush mounted in an opening in the vehicle, and a deployed position in which at least a portion of the deflector panel is disposed above the opening to engage an airstream flowing over the heed vehicle.

5. The adjustable vehicular airflow control device of claim 1, further comprising a controller coupled in communication with the actuator assembly, the controller operable to automatically control the actuator assembly to move the deflector panel based upon a sensed speed of the vehicle.

6. The adjustable vehicular airflow control device of claim 1, further comprising a controller coupled in communication with the actuator assembly, the controller operable to automatically control the actuator assembly to adjust the elevation and the inclination of the deflector panel based upon a sensed speed of the vehicle.

7. The adjustable vehicular airflow control device of claim 1, wherein the actuator assembly is adapted to rotate the deflector panel without resulting in a substantial change in the longitudinal position of the deflector panel.

8. An adjustable vehicular airflow control device comprising:
  (a) a deflector panel adapted to be disposed on a vehicle to selectively control airflow about of the vehicle; and
  (b) an actuator assembly coupled to the deflector panel, the actuator assembly adapted to selectively displace the deflector panel independently in three or more degrees of freedom.

9. An adjustable vehicular airflow control device comprising:
  (a) a deflector panel for mounting on a vehicle;
  (b) an actuator assembly coupled to the deflector panel, the actuator assembly adapted to adjust a position of the deflector panel relative to the vehicle; and
  (c) a controller coupled in communication with the actuator assembly, the controller operable to automatically control the actuator assembly to adjust the position of the deflector panel in a vertical, horizontal, and rotational manner independently of one another based upon a sensed speed of the vehicle.

10. A front section of a vehicle comprising:
  (a) a hood having a top surface, the top surface having an opening therein;
  (b) an adjustable airflow control device comprising:
    (i) a deflector panel; and
    (ii) an actuator assembly for moving the deflector panel into a stored position in which the deflector panel is substantially flush mounted in the opening, and a deployed position in which at least a portion of the deflector panel is disposed above the top surface to engage an airstream flowing over the top surface, and wherein the actuator assembly is adapted to adjust the deployed position of the deflector panel by adjusting an elevation without resulting in a substantial change in an inclination or a horizontal position of the deflector panel.

11. A method of controlling a position of a deflector panel disposed on a vehicle, the method comprising:
  (a) sensing a speed of the vehicle; and
  (b) automatically adjusting an inclination and a height of the deflector panel independently of one another based upon the sensed speed of the vehicle, such that the height of the deflector panel may be adjusted without resulting in a substantial change in a longitudinal position or the inclination of the deflector panel.

12. The method of claim 11, further comprising simultaneously adjusting a height and the inclination of the deflector panel based upon the sensed speed of the vehicle.

13. The method of claim 11, further comprising decreasing an inclination of the deflector panel as the sensed speed increases.

14. The method of claim 11, further comprising decreasing a height of a center of the deflector panel as the sensed speed increases.

15. The method of claim 11, further comprising selectively positioning the deflector panel in a stowed position in which the deflector panel is flush mounted within an opening in a top surface of the vehicle.

16. The method of claim 11, further comprising simultaneously lowering a height of a center of the deflector panel and decreasing an inclination of the deflector panel based upon an increase in the sensed speed of the vehicle.

17. An adjustable vehicular airflow control device comprising a deflector panel adapted to be disposed on a vehicle to selectively control airflow about of the vehicle, the deflector panel independently adjustable in a first linear direction, in a second linear direction, and in an inclination relative to the vehicle while the vehicle is moving.

18. An adjustable vehicular airflow control device comprising a deflector panel adapted to be disposed on a vehicle to selectively control airflow about the vehicle, the deflector panel independently adjustable in a fore and aft direction, in elevation, and in inclination relative to the vehicle while the vehicle is moving such that movement of the deflector panel is not restricted to a single predetermined path.

19. An adjustable vehicular airflow control device comprising a deflector panel adapted to be disposed on a vehicle to selectively control airflow about the vehicle, the deflector panel adjustable in a vertical direction relative to the vehicle and in inclination relative to the vehicle, and wherein the deflector panel may be adjusted in the vertical direction without substantially changing a fore and aft location or the inclination of the deflector panel.

* * * * *

UNITED STATES PATENT AND TRADEMARK OFFICE
CERTIFICATE OF CORRECTION

PATENT NO.    : 6,926,346 B1
DATED         : August 9, 2005
INVENTOR(S)   : A.C. Wong et al.

It is certified that error appears in the above-identified patent and that said Letters Patent is hereby corrected as shown below:

Column 8,
Line 51, "about of the" should read -- about the --.
Line 56, "panel and" should read -- panel, and --.

Column 9,
Line 7, "the heed vehicle." should read -- the vehicle. --.
Line 26, "about of the" should read -- about the --.

Signed and Sealed this

Thirteenth Day of December, 2005

JON W. DUDAS
*Director of the United States Patent and Trademark Office*